(12) United States Patent
Tobkin et al.

(10) Patent No.: US 12,244,731 B2
(45) Date of Patent: Mar. 4, 2025

(54) UNITY PROTOCOL CONSENSUS

(71) Applicant: Unity Chain, Inc., San Francisco, CA (US)

(72) Inventors: Joshua Tobkin, San Francisco, CA (US); Jonathan Jones, San Francisco, CA (US)

(73) Assignee: Unity Chain, Inc., Miami, FL (US)

( * ) Notice: Subject to any disclaimer, the term of this patent is extended or adjusted under 35 U.S.C. 154(b) by 335 days.

(21) Appl. No.: 17/629,128

(22) PCT Filed: Jul. 24, 2020

(86) PCT No.: PCT/US2020/043463
§ 371 (c)(1),
(2) Date: Jan. 21, 2022

(87) PCT Pub. No.: WO2021/016546
PCT Pub. Date: Jan. 28, 2021

(65) Prior Publication Data
US 2022/0278854 A1  Sep. 1, 2022

Related U.S. Application Data

(60) Provisional application No. 62/878,008, filed on Jul. 24, 2019.

(51) Int. Cl.
*H04L 9/32* (2006.01)
*H04L 9/00* (2022.01)

(52) U.S. Cl.
CPC .............. *H04L 9/3255* (2013.01); *H04L 9/50* (2022.05)

(58) Field of Classification Search
CPC ................................ H04L 9/3255; H04L 9/50

USPC ........................................................ 713/176
See application file for complete search history.

(56) References Cited

U.S. PATENT DOCUMENTS

| | | |
|---|---|---|
| 2008/0280686 A1 | 11/2008 | Dhupelia et al. |
| 2014/0019171 A1 | 1/2014 | Koziol |
| 2016/0261690 A1 | 9/2016 | Ford |
| 2017/0061398 A1 | 3/2017 | Joseph |
| 2017/0132620 A1 | 5/2017 | Miller et al. |

(Continued)

OTHER PUBLICATIONS

PCT/US2020/043463 International Search Report mailed Oct. 19, 2020 (2 pages).

(Continued)

*Primary Examiner* — Jeffrey C Pwu
*Assistant Examiner* — Samuel Ambaye
(74) *Attorney, Agent, or Firm* — HEA Law PLLC; Darrin A. Auito (57) ABSTRACT

A novel structured random sample consensus protocol to greatly improve blockchain and distributed ledger technology throughput and scalability, while maintaining decentralization and high levels of security. The invention leverages small committees of fixed sizes, called "Clans," threshold cryptography, and logical virtual districts, called "Tribes," in order to deterministically random sample disparate nodes for sentiment analysis on a transactions validity, thereby only requiring a relatively small subset of nodes to validate any particular transaction or batch of transactions thus enabling much greater concurrency and parallel processing compared to other more linearized consensus algorithms, while maintaining high security.

18 Claims, 2 Drawing Sheets

(56) References Cited

U.S. PATENT DOCUMENTS

2019/0342383 A1* 11/2019 Matican .................. H04L 67/10
2020/0162264 A1* 5/2020 Zamani ............... H04L 41/0893

OTHER PUBLICATIONS

PCT/US2020/043463 Written Opinion of the Int'l Searching Authority mailed Oct. 19, 2020 (4 pages).
Qu et al., "Blockchain Based Credibility Verification Method for IoT Entities", Hindawi Security and Communications Networks vol. 2018, Article ID 7817614, 2018, retrieved on [Sep. 22, 2020]. Retrieved from the internet Cited in PCT/US2020/043463 Int'l Search Report mailed Oct. 19, 2020.

* cited by examiner

UNITY PROTOCOL CONSENSUS

REFERENCE TO THE RELATED PATENT APPLICATION

The present application claims benefit of U.S. Provisional Application No. 62/878,008 filed on Jul. 24, 2019 and is a National Stage of International Application No. PCT/US20/43463 filed on Jul. 24, 2020. The content of the above documents is incorporated by reference in its entirety.

TECHNICAL FIELD

The present disclosure relates to an improved operating system which solves blockchain scalability without sacrificing decentralization, security, or speed.

BACKGROUND OF THE INVENTION

A problem exists in the art of digital ledgers in which transactions made are secure and recorded chronologically publicly (or privately), namely, that it is difficult to scale the system without sacrificing decentralization, security, or speed (e.g., "scalability problem"). Blockchain (or blockchain system or blockchain technology) is one form of distributed ledger, e.g., not all distributed ledgers use a chain of blocks to provide a secure and valid distributed consensus.

Transaction volumes worldwide are growing exponentially (e.g., due to growth of ecommerce, rise of Internet of Things (IoT), in-app purchases, etc.) and magnify this problem. For example, the Bitcoin blockchain processes 4.6 transactions per second. Whereas, Visa processes around 1,700 transactions per second on average (based on a calculation derived from the official claim of over 150 million transactions per day). The potential for blockchain adoption for Visa, like many other companies, is bottlenecked currently by scalability.

Furthermore, the full potential for blockchain technologies have not been realized due to the scalability challenges in most designs. For example, there are a growing amount of IoT devices being integrated into industry, and using blockchain for data integrity and complex coordination between parties, as a single reliable source of truth, could provide much value, yet there is limited adoption due to a lack of scalability. Our design aims to solve the scalability problems of traditional blockchains, thereby unlocking the potential for mass adoption.

Generally, blockchain scalability is influenced by the following factors: limitations, block size, and response time, e.g., limitations in consensus algorithms.

Limitations occur when, as the number of events and users increase, the system "buckles" from the data since the amount of transactions trying to be processed, while the data is also ever increasing, causes severe congestion.

Block or data size is a limitation caused by the amount of data available within each block or processed transaction.

Response times are the amount of time required to verify or create a block or process a transaction or a batch of transactions.

The following list of terms and their meanings are provided to help in understanding this disclosure and are not intended to limit the concepts to the terms and/or meanings provided.

Aggregate Signature: Aggregate signature schemes are used to condense n signatures on messages into a single signature of constant length with respect to the n users.

Auto-Scaling: Ability to scale the numbers of nodes involved in seeking agreement as needed to maintain security, throughput, and integrity of the network if system predicates are not met.

Batch ID: Unique hash value of a batch of transactions.

Blockchain: Digital ledger in which transactions made are secure and recorded chronologically and in a tamper proof manner. Virtually anything of value can be tracked and traded on a blockchain network.

Clans: Quorums of nodes of fixed size, for example small committees of 13 nodes, that collectively play the various roles in the network ("Leaders", "Oracles", "RSIPs"). Having Clans of fixed size makes it easier for system roles and responsibilities to be shifted among various Clans during each new Cycle.

Consensus: When there is an agreement on the validity of a transaction, for example, independent nodes verifying the validity of transactions, namely a codified set of rules.

Cryptographically Signed: A signing algorithm that, given a message and a private key, produces a signature. A signature verifying algorithm that, given the message, public key and signature, either accepts or rejects the message's claim to authenticity.

Cycle: A period of time, for example, 5 minutes, in which nodes play various roles (e.g., Leaders, Oracles, RSIPs) of the protocol before they are randomly assigned to new positions and roles in the network for the next Cycle.

Distributed Ledger: A distributed ledger is a database that is decentralized, for example, distributed across several computers or nodes. In this technology, every node will maintain the ledger, and if any data changes happen, the ledger will get updated. The updating takes place independently at each node.

Hash Function: A one-way hash function, also known as a message digest, fingerprint or compression function, is a mathematical function which takes a variable-length input string and converts it into a fixed-length binary sequence.

Ledger: A collection of transactions.

Nodes: Computers or machines connected to the network which possess a copy of the blockchain data.

Oracles: An oracle, in the context of blockchains and smart contracts, is an agent that finds and verifies real-world occurrences and submits this information to a blockchain to be used by smart contracts. In the present case, the meaning of Oracles also includes the role of coordinators of transaction routing in the system.

Random Sample Interpret Protocol nodes (RSIPs): Randomly selected nodes that are required to re-run the rules of the protocol for additional verification.

Threshold Signature: Threshold signatures are a type of cryptographic signature in which only n out of m are required to sign a message together to create a valid group signature. Any combination of n out m signatures are required to achieve a valid group signature. In the system described below, in order for Clans to create threshold signatures, at the beginning of each new cycle they undergo a Distributed Key Generation procedure in which they all contribute to the final group public key Tribal Leaders (Tribal Leader Clan, Leader Clan): The Clan or nodes selected to handle the first phase of validating transactions. In the system described below, the Tribal leaders each Cycle may be a single clan randomly selected from the Clans of all Tribes. Further, next Cycle Tribal Leaders may be from the same Tribe or a different Tribe.

Tribal Map: The tribal map contains all the node identities and the logical positions they are playing for the Cycle, which can include which Clan, Tribe, and roles they are currently participating in.

Tribes: Tribes are virtual districts that are comprised of multiple Clans.

Validator Node: A node that checks the blockchain ledger to determine if the transaction to be processed is valid.

Verifiable Random Functions (VRF): Random Number Generators that derive their randomness from taking the alpha-numeric outputs of hash functions and translating them into decimal values.

SUMMARY OF THE INVENTION

One objective of the present disclosure is to design a decentralized general computer network that achieves scalability without compromising security, throughput, or decentralization.

Another objective is to design a decentralized general computer network which enables groups of computers or nodes to reach agreement on machine state in a disparate network to validate transactions in a very high throughput manner through randomized parallel, concurrent processing.

Another objective of the invention is to design a decentralized general computer network that does not rely on solving Proof of Work ("PoW") hashes, e.g., block generation, mining, etc. in order to stay decentralized.

Technological advantages resulting from the system described in the present disclosure include, for example, reduced resource demands on the network (e.g., lower hardware costs, reduced power processing and memory demands), higher transaction throughput for replicated state machine distributed systems, such as in the context of blockchain, while maintaining greater security, speed, and scalability than other consensus protocols. Other advantages include minimizing opportunity and impact of bad actors (e.g., scammers or hackers).

In one aspect of the invention, as discussed below, transactions (i.e., a transaction may be a single transaction or batch of transactions for purposes of this disclosure, e.g., thousands of transactions per batch of transactions) are processed through a consensus algorithm, with each a subset of nodes from randomized "Clans" signing the transaction. The final transaction will also include an aggregated signature that is unpredictable and cannot be forged. To verify the aggregate signature is real and therefore the transaction went through consensus, nodes check the aggregate signature for correctness against its knowledge of the network topology and the "Hash" of the transaction or Batch ID. If correct, they accept the state changes (i.e. the transaction).

According to one embodiment, Nodes are at least roughly evenly distributed randomly into Tribes at a start of a cycle, e.g., 50-100 Nodes per Tribe. The number of Nodes in Tribes and the number of Tribes can be arbitrarily decided upon based on the level of security required or desired for the system, though an odd number of Tribes is recommended in order to resolve any tie breakers.

One purpose of Nodes is to preserve the integrity of the distributed database and blockchain ledger. The entire and current blockchain state can be preserved on a single node running in the system and indeed on each and every machine in the system, anywhere in the world. This makes the system extremely resilient to things like hacks, power failures, or systemic crashes. Systems typically have hundreds, thousands, or tens of thousands of nodes running at any given time. In one example, 5 of out of 7 Tribes are selected, with the security of the network affected by the total number of Tribes selected, i.e. less Tribes sampled and involved, less security.

The process may start when a transaction is broadcast to a network and routed to a current cycle's Tribal Leaders. Tribal Leaders may be randomly elected/selected each cycle. Each cycle, for example, can be approximately 5 minutes or arbitrarily long in duration, before the next randomized procedure initiates to elect the next set of nodes that shall play the role of Tribal Leaders for the subsequent cycle. The election procedure should be sufficiently randomized and unpredictable. There are various known methods of accomplishing a sufficient randomness process, including, for example, verifiable random functions (VRFs) to be used for randomness generation.

Next, the selected Tribal Leaders may propose a transaction to each other from their message queue (a backlog of pending transactions that are to be processed next) and perform validation on the transaction by checking a blockchain ledger (e.g., or other ledger/database configuration) to determine whether the transacting accounts have correct balances or appropriate rights. The Tribal Leaders check the ledger and then broadcast to each other the result/answer, for example, Yes or No, is this a valid transaction or not, and share their vote to each other, for example, by providing their digital signature if in agreement or withholding their digital signature if not in agreement.

If a threshold number (e.g. $\frac{2}{3}+1$) of Tribal Leaders agree (threshold agreement), then the transaction is allowed to move forward towards the next steps of the protocol. If a threshold agreement is not achieved, then the transaction(s) is discarded. If a threshold number of the Tribal Leaders (e.g., this is a configurable system parameter) do not reach consensus on this level, then the transaction may be dropped and unable to propagate to the rest of the network. In other words, a tunable threshold (e.g., set by system designer) of Tribal Leaders must come to an agreement for the transaction to continue through its validation process. For example, at least $\frac{2}{3}+1$ of the Tribal Leaders must come to an agreement to achieve a valid aggregate signature which signifies an agreement at this level.

If a threshold number of the Tribal Leaders agree, then the transaction is sent to a clan of Oracles. The Oracles function as coordinators in the system and are responsible, for example, for randomly sampling the Tribes for Clans to be assigned the transaction to said randomly sampled nodes and interpreting their results. There are various known methods of accomplishing a sufficient randomness process, including, for example, VRFs to be used for randomness generation.

One purpose of randomly sampling the Tribes, which are made up of Clans of fixed size population (e.g. 13 nodes per clan) and having those nodes process the transactions further is to perform an additional "sentiment analysis" on the transaction's validity, as well as to keep the Tribal Leaders accountable.

Sentiment analysis is to get a snapshot on the transaction's validity from a smaller subset of the entire system (i.e. if the Leader Clan AND five other random selected Clans with a strong majority all vote the same way, with very high probability the transaction is valid). It is required that a threshold number (most or all) of the sampled Clans must reach agreement and be in alignment with the Leader Clan in order to trust the sampled data with confidence, since we are sampling only a subset of all the nodes of the entire network to drive a conclusion. Statistically if the Leader Clan and five additional Clans are all able to achieve agreement, then the transaction is determined to be valid with high probability.

Sampled nodes do not need to be part of a fixed-sized committee, they can be individual nodes too, but there are performance gains to be had by having all the committees be the same size, such as committees themselves can be rotated into different network roles with more ease when they are consistently the same size without having to reconstitute their multi-signature configurations every new cycle.

This system, for example, is fundamentally a probabilistic system and bad actors can try to collude to interfere with an outcome. Thus, the additional step of having random sampled committees review the transaction validity to achieve consensus on transaction validity increases the security of the system, e.g., minimizes chances that bad actors on the Tribal Leader level could enable invalid transactions to be accepted as valid.

The selected Oracle Clan (out of potentially a multitude of Clans that can at any time be assigned the role of Oracle for the transaction), for example, is to be configured to utilize information from the transaction, such as the hash of the transaction, to randomly sample the Clan population of each Tribe, selecting a fraction of nodes or a Clan in each Tribe and assigning the transaction to those nodes for further verification and validation.

A one-way hash function applied to the transaction will generate an alphanumeric string, which when turned to a decimal value essentially plays the role of unpredictable randomness when modulus that number against the known node identities and logical positions played in the network. This random number generator or a variant of it is thereafter utilized to deterministically sample a set of nodes or a Clan from each of the elected Tribes.

Additionally, the nodes of the Oracle Clan may come together to sign the hash of transaction data and utilize the unpredictable, unique group signature resulting on that hash to be the verifiable random function to determine which Clans thereafter are to be assigned this transaction to further validate it.

Both of these processes are deterministic, meaning that it can be calculated by other observer nodes and verified quickly, but unpredictable in advance. Any unpredictable deterministic random number generation process may be a suitable substitute for this process.

After the Tribe sampling and sentiment analysis process (e.g., "Random Sample Interpret Protocol" or "RSIP") is complete, the RSIP nodes (e.g., the randomly sampled nodes) send their votes to each other and upon creating a threshold signature for their RSIP Clan, thereafter send back their group signature to the Oracles, who will then wait for valid threshold signatures from all the assigned Clans (e.g. 5 out of 5 sampled Clans achieve threshold majority group agreement). The exact predicates of this requirement are tunable parameters by the system designer. For example, the Oracles may be configured to wait for a strong majority or all Clans to respond in agreement, with all nodes in each Clan being able to reach a ⅔+1 threshold agreement response with their digital signatures.

For example, the RSIP nodes are performing the same (or essentially the same) tasks as the Tribal Leaders. However, one key here is that this is achieved in parallel linear time. For example, suppose five additional RSIP Clans are assigned to further run consensus on the transaction and that they are assigned this task at the same time by the Oracles. This effectively provides five times (5×) more nodes involved in the verification while only taking the same amount of linear time as if a single additional Clan was coordinated and instructed to re-run the consensus for the transaction. This parallel, concurrent processing can be done in the same or similar linear time as it would take for a single additional Clan to re-run validation, but instead through this design the system can also benefit from 5× additional security because there are five additional random clans re-running validation rather than just one.

In the event, for example, that Oracles collect five out of five aggregate threshold signatures (e.g., a system parameter to be set by the designer implementing this protocol based on desired security concerns) from the Randomly Sampled Clans (RSIPs), the Oracles themselves are required to achieve a threshold agreement that the correct sampled Clans have achieved their own majority agreements. Oracles then will send the signatures of the Clans that have participated in consensus for the transaction, the transaction identifier or Batch ID, as well as their own group threshold signature, along back to the Leader Clan.

In the event that Oracles do not achieve the predicated threshold signatures from the sampled Clans, they will signal back to all the Clans in the Tribe or Tribes whose originally sampled RSIP nodes are in the minority vote and require them to all review the transaction data and cast their vote on the transaction data validity. This auto-scaling consensus requirement may be triggered when predicates are not achieved, i.e. 5 out of 5 RSIP Clans are not able to achieve threshold group signatures on the transaction data. Scaling up in this manner provides a larger sample for sentiment analysis to be performed upon to get a better sense of which Clans are voting accurately or not. If after multiple rounds of this and there is no clear majority, all nodes may be asked to re-run the transaction as a last resort in order to seek a majority agreement and thereby identify the Clans in the minority and optionally to penalize them.

As discussed above, the normal operations of the protocol is to sample one RSIP Clan from each selected Tribe. The actual constitution of each Tribe is made up of multiple Clans and is therefore substantially greater in number of nodes than the total number of nodes that are randomly sampled (i.e. five Clans from seven possible Tribes). In other words, each individual Tribe consists of more than five Clans. As a result, for example, by auto-scaling up to all of the Clans in a Tribe, the Oracles are able to achieve a larger sample size and thus, with high probability, be able to draw a better conclusion of the interpreted results, e.g., by comparing minority and majority decisions.

The ability to auto-scale the sample size if predicate minimums are not achieved is an improved capability of the invention. One of the main benefits is that the system can randomly sample a smaller subset of nodes, while if the results are unclear (i.e. system predicates are not met), it can scale up the nodes required to process transaction data as necessary. In the event that after auto-scaling nodes to re-run verification, the majority vote is in alignment with the prior majority vote of the RSIP and Leader Clan, then the sampled Clans in the minority of the prior attempt to reach agreement can be identified and disqualified or otherwise punished by the protocol.

Furthermore, in the event the RSIP nodes are all in agreement that the Leader Clan's votes are invalid, the RSIP nodes may punish or forcibly remove the Tribal Leaders. This self-policing mechanism is a hallmark capability that is enabled by having the network's architecture organized into Clans and Tribes as described herein.

In a situation in which the RSIP Clans achieve threshold vote in alignment with the Tribal Leaders, with high probability the transaction is valid, the Oracles collect the digital signatures of the RSIP nodes, in addition to their own signatures, send these digital signatures and the transaction or transaction Batch ID to the Tribal Leaders, who shall verify that the signatures are valid, and that the correct Oracle and RSIP Clans have signed the correct transactions.

This verification process is achievable, for example, because the membership in the network for the Cycle is known at the beginning of the round, and the assignment of RSIP nodes to a transaction is a deterministic random process that is not predictable in advance, but cryptographically easy to verify thereafter. If all steps are correct, the Leader Clan shall combine the submitted digital signatures into one final aggregate signature and broadcast this transaction to all nodes in all tribes and the accompanying aggregate group signature on the BatchID.

Every database object that is updated in the system will carry with it this aggregate signature, referred, for example, as a "Proof of Digital Tribunal Signature."

Nodes compare the aggregate signature to the information they have of the network's membership to cross-reference the validity of the aggregate signatures. Membership of the network is known at the beginning of the Cycle and contained in a blockchain that all nodes possess, e.g., a distributed ledger that cryptographically references the prior block of information, thereby, creating a chain of blocks. If the signatures are valid, the updated object's value is determined to be true, as it is assumed to have completed the procedure (i.e., Unity Protocol Consensus procedure).

As described above, only a small subset of nodes are randomly assigned per Tribe to a transaction at any given moment. As a result, the network can parallel process many transactions in concurrency, thereby substantially increasing the throughput of the network compared to other network designs.

The system described herein provides greater throughput to achieve consensus in a distributed system than all known designs, while also decreasing time to finality on transactions and maintaining high security. For example, the inventors test of the present system netted over 10,000 transactions per second in a system of 600 global nodes with the compute power of a standard laptop per node. This significant improvement in throughput for a consensus algorithm enables countless applications to be Blockchain, or Distributed Ledger Technology, enabled.

BRIEF DESCRIPTION OF DRAWINGS

The present invention is illustrated by way of example and not limited in the figures of the accompanying drawings in which like references indicate similar elements.

DETAILED DESCRIPTION

All identically numbered reference characters correspond to each other so that a duplicative description of each reference character in the drawings may be omitted.

Figure 1:
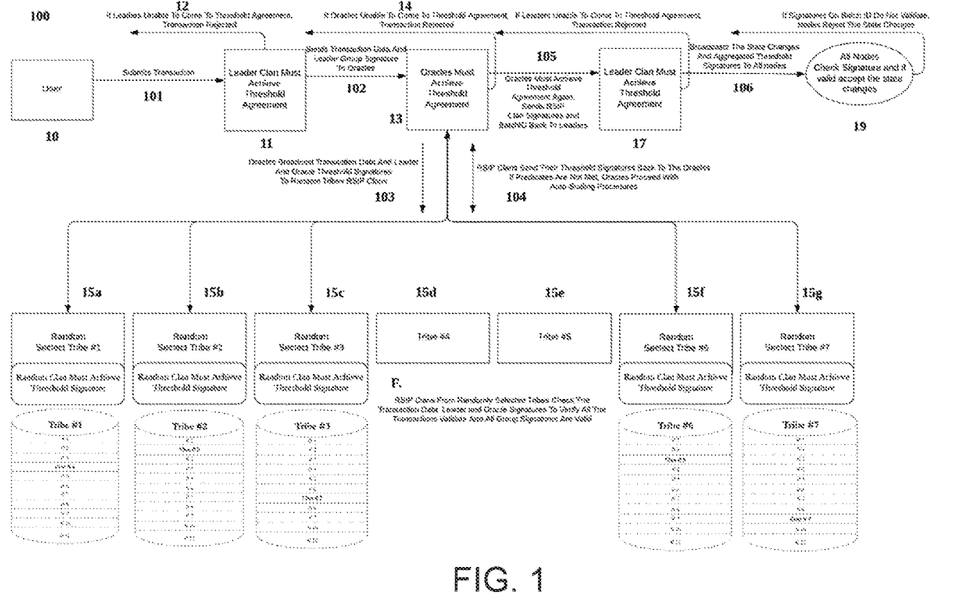
FIG. 1 illustrates a flowchart illustrating one embodiment of a decentralized general computer network.

According to one embodiment, illustrated in FIG. 1, a user 10 sends a transaction (or contract) to current Leader Clan 101. The Leader Clan must achieve a majority agreement to produce a valid threshold signature, in which a majority of the Tribal Leaders agree on the transaction's validity and sign together on the same data to form a valid aggregated (combined) group signature 11, otherwise the transaction is discarded 12.

To determine whether to affirm the transaction, each Node within the Tribe sends each other their partial group signature on the transaction to all other nodes of the Leader Clan. All active and valid nodes know the population of the other nodes in the network and which Tribe and Clan each node belongs to for the current Cycle.

Once threshold, e.g. $2/3+1$, of the nodes in the Clan collect enough signatures, a final valid signature is produced. As long as $2/3+1$ of the nodes of the clans, i.e. 9 out of 13 nodes, come together (and any combination of 9 out of 13 partial signatures are combined together signing the same message) the outcome final signature, despite which actual of the 9 of 13 nodes participated, will always be the same and easily verifiable.

If in agreement, the Leader Clan will send the transaction data and their group threshold signature to the selected Oracle Clan, this signifies Leader Clan agreement on the validity of the transaction data transmitted 102.

The Oracle Clan must reach threshold agreement on 1) Leader Clan threshold signature, 2) which Tribes should be assigned this transaction, and 3) which Clans within the randomly selected Tribes should be assigned this transaction 13. This random selection process for which RSIP Clans is through a deterministic verifiable random function. If Oracles are unable to come to an agreement, the transaction is ultimately rejected 14.

Upon reaching a threshold agreement, the Oracle Clans broadcast the transaction data and the Leader and Oracle Clan's valid group threshold signature to the randomly determined RSIP Clans of a majority of Tribes, for example a random 5 out of 7 Tribes 103.

RSIP Clans from the randomly selected Tribes check the transaction data and Leader and Oracle Clan's group threshold signatures to verify all the transactions and signatures are valid 15a-g. This is accomplished, for example, by comparing the transaction data to their local copy of the database state, which all nodes possess, and by checking the transaction hash or BatchID compared to one's local copy of the Tribal Map, which is the knowledge of which nodes are part of which Clan, Tribe, and currently active role in the network for the cycle. RSIP Clans can thereby ensure the correct Oracles and Tribal Leaders were deterministically assigned this transaction based on the hash of said transactions and the accompanying cryptographic signatures. RSIP Clan nodes themselves seek to achieve a group majority threshold agreement on the transactions' validity as well as verify that the correct Leader and Oracles achieved a valid threshold signature 13.

Each RSIP Clan upon agreement sends their threshold signatures back to the Oracles 104, who wait for a tunable predicate of, for example 5 out of 5, RSIP Clans to respond back with their group threshold signatures. If the tunable predicate is not met, the Oracles may signal back (request) more Tribes and Clans to re-run the transaction thereby auto-scaling the amount of Clans involved in validating the transaction 104. If RSIP Clans are not able to reach a threshold majority agreement, then they will not be able to produce a valid group signature to send to the Oracles, which will signal an anomaly to the Oracles (e.g., something is awry) and initiate auto-scaling procedures. The auto-scaling procedure can be performed as needed by the system, e.g., multiple times for each transaction.

Assuming the RSIP Clans respond to the Oracles with their valid group threshold signatures (before or after auto-scaling), the Oracles must achieve threshold agreement that enough and the correct RSIP Clans have achieved a group threshold signature on the transaction and that the correct Tribal Leaders and Oracles signatures are accurate in relation to the transaction ID or Batch ID 16. If in agreement, they send the RSIP group threshold signatures back to the Leader Clans, along with their own majority group signature and the transaction ID or Batch ID 105. If the Oracles are unable to come to a valid majority affirmative agreement, the transaction may be rejected 14.

The Leader Clan that originated the transaction then must achieve a final group threshold signature on the transaction and verify the correctness of the RSIP and Oracles signatures 17.

If final agreement of the validity of the transactions and the group signatures of the Oracle and RSIP Clans is reached, then the Tribal Leaders will broadcast the database state changes accompanied with their aggregate signature, the Batch or Transaction ID, and all of the signatures of Leader, Oracle, and RSIP Clans that were deterministically randomly assigned to validate this transaction 106. These signatures can be aggregated further into a final single aggregate signature if desired, while still remaining cryptographically deterministic and unforgeable. If the Tribal Leaders are unable to come to a threshold majority agreement on the validity of the transaction data or the received threshold signatures, the transactions may be rejected 18.

The last step of the protocol is that all of the nodes that receive an incoming state change request need to check the accompanying signatures from the Tribal Leaders, Oracle, and RSIP Clans in comparison to the transaction data and their Tribal Map to verify that the transaction has gone through the correct channels and set of nodes towards seeking consensus and that the required Clans have been able to produce valid threshold signatures.

If the database state change requests and associated signatures and data validate, nodes following the protocol individually accept the state changes and update their database values also storing the aggregate signatures that accompanied the state changes 19, and the transaction is complete and further propagated until all honest nodes make the appropriate updates.

If, however, the signatures or aggregate signature on batch do not validate, the nodes can reject the state changes 20.

In the normal case, in Unity Protocol Consensus only a fraction, e.g. 5%, of the nodes at any given time are responsible to validate specific transaction data, while still maintaining a high degree of security. This enables greater load balancing, concurrency, and parallel process than other more linearized consensus protocols.

Figure 2:
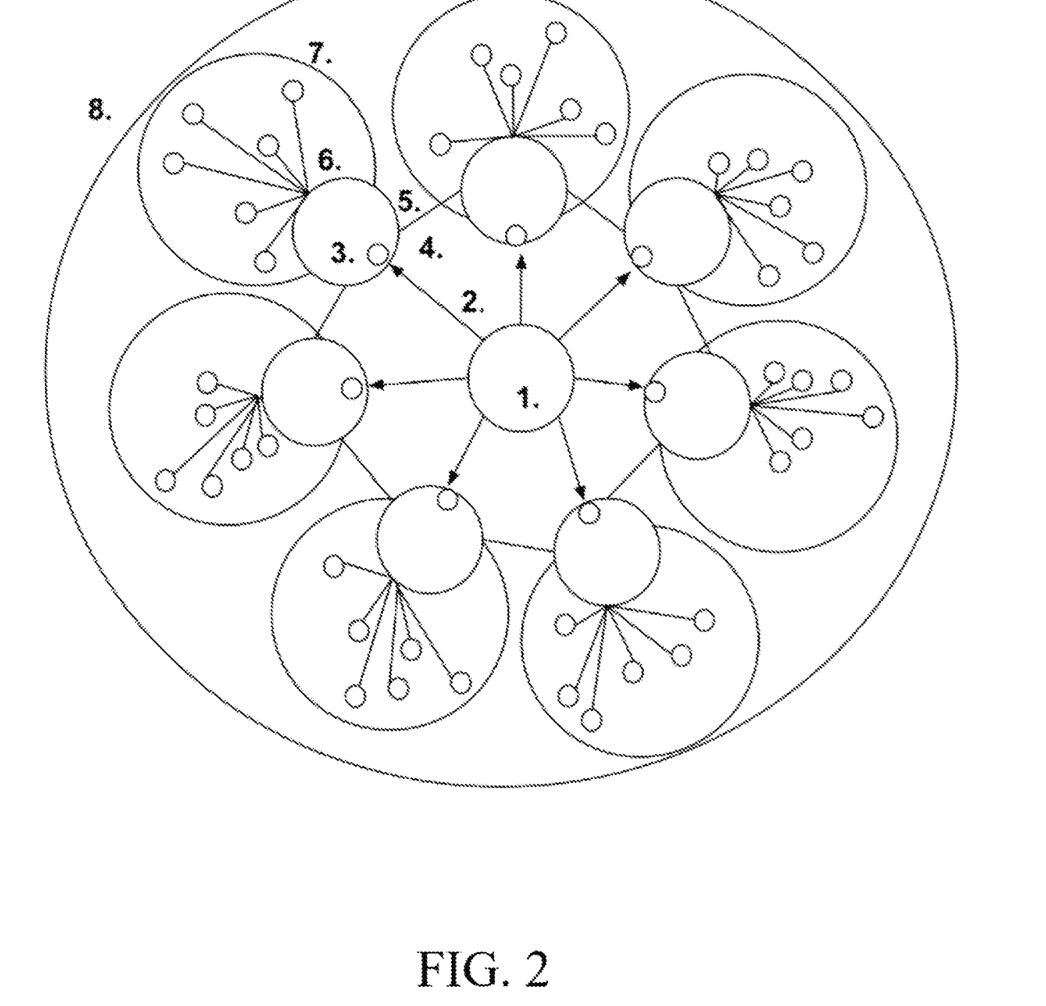
FIG. 2 illustrates one embodiment of a decentralized general computer network.

According to another embodiment, illustrated in FIG. 2, a user (1) sends a transaction to current Tribal Leaders (2). The Tribal Leaders reach agreement on the transaction or batch of transaction and send them to the Oracle Clan(s) (3).

The Tribal Leaders validate the transaction (4) and if a threshold of them agree, they achieve a Unity Event (achieves consensus on the Tribal Leader Level) (5).

The Oracles randomly sample the nodes in the different Tribes (6). These RSIP nodes vote on the transaction's validity and share their results to each other and to the Oracles who compare the results of all the RSIP nodes from different tribes to one another (7).

If the threshold of nodes are able to achieve consensus, then the Oracles send back the signatures of the RSIP nodes, their signature, and the transaction ID back to the Tribal Leaders, who verifies the signatures against their copy of the blockchain which contains the membership information of the network for this cycle, and if verified, signs the transaction with their private key with the other prior signatures to generate a new aggregate signature which is then broadcast to the network for all nodes to save (8).

The system, for example, can be used in any system that requires distributed consensus, e.g., it can be the consensus engine in a blockchain and may be used in distributed or decentralized system to achieve majority decisions by first sampling the network and then proceeding with the branching logic as necessary to gain a sentiment analysis of the system, while not requiring all nodes in the network to participate in the procedure and still achieving an accurate view of the network status with high probability.

The preceding description of the disclosed embodiments is provided to enable any person skilled in the art to make or use the present subject matter. The general architecture may be configured and altered to enable flexible solutions. To achieve the goals of improved security and speed, for example, different parameters can be altered based on desired security requirements.

Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

We claim:

1. An apparatus comprising a computing terminal accessing a decentralized computer network for conducting a transaction, said network comprising:
   a plurality of clans comprising a plurality of nodes;
   a plurality of tribes comprising the plurality of clans;
   an oracle clan, wherein the oracle clan is one of the plurality of clans; and
   a leader clan; wherein
   said leader clan is configured to receive said transaction and upon receipt of said transaction, determine whether to affirm said transaction;
   if said transaction is affirmed by the leader clan, then the leader clan is configured to send said transaction and a leader clan signature to the oracle clan for affirmation;
   if said transaction and the leader clan signature are affirmed by the oracle clan, then the oracle clan is configured to send (i) said transaction, (ii) the leader clan signature, (iii) and an oracle clan signature to a first plurality of randomly selected clans ("first RSIP clans");
   wherein if said transaction, the leader clan signature, and the oracle clan signature are affirmed by the first RSIP clans, then the first RSIP clans are configured to send first RSIP signatures to the oracle clan;
   wherein the oracle clan is configured to receive the first RSIP signature from the first RSIP clans and determine whether to affirm the first RSIP signatures;
   wherein if the oracle clan affirms the first RSIP signatures, then the oracle clan is configured to send said transaction, the oracle clan signature, and the first RSIP signatures to the leader clan;

wherein the leader clan is configured to receive said transaction, the oracle clan signature, and the first RSIP signatures from the oracle clan and determine whether to affirm said transaction, the oracle clan signature, and the first RSIP signatures, wherein if the leader clan affirms said transaction, the oracle clan signature, and the first RSIP signatures, then the leader clan broadcasts said transaction to the plurality of nodes, wherein if the first RSIP clans do not affirm said transaction, the leader clan signature, and the oracle clan signature, then the oracle clan sends said transaction, the leader clan signature, and the oracle clan signature to a second plurality of randomly selected clans ("second RSIP clans") to affirm said transaction, wherein the second RSIP clans comprise a larger number of nodes than the first RSIP clans, and wherein the network is accessed by said computing terminal.

2. The decentralized computer network of claim 1, wherein if said transaction, the leader clan signature, and the oracle clan signature are affirmed by the second RSIP clans, then the second RSIP clans are configured to send second RSIP signatures to the oracle clan, and the oracle clan is configured to receive the second RSIP signature from the second RSIP clans and determine whether to affirm the second RSIP signatures.

3. The decentralized computer network of claim 2, wherein if the oracle clan affirms the second RSIP signatures, then the oracle clan is configured to send said transaction, the oracle clan signature, and the second RSIP signatures to the leader clan;

the leader clan is configured to receive said transaction, the oracle clan signature, and the second RSIP signatures from the oracle clan and determine whether to affirm said transaction, the oracle clan signature, and the second RSIP signatures, and if the leader clan affirms said transaction, the oracle clan signature, and the second RSIP signatures, then the leader clan broadcasts said transaction to the plurality of nodes.

4. The decentralized computer network of claim 1, wherein the leader clan determines whether to affirm said transaction based on blockchain data.

5. The decentralized computer network of claim 1, wherein the leader clan affirms said transaction when a threshold number of the plurality of nodes comprising the leader clan affirm the transaction, and the plurality of nodes comprising the leader clan is a protocol determined clan.

6. The decentralized computer network of claim 1, wherein the plurality of nodes store or reference said transaction in block data after the leader clan broadcasts said transaction.

7. The decentralized computer network of claim 1, wherein the first RSIP clans are configured to perform a sentiment analysis by affirming or not.

8. The decentralized computer network of claim 1, wherein each of the first RSIP clans comprise a same number of nodes.

9. The decentralized computer network of claim 1, wherein if the first RSIP clans do not affirm said transaction, the leader clan signature, and the oracle clan signature, then the oracle clan sends said transaction, the leader clan signature, and the oracle clan signature to the clans in the tribe or tribes of the clans in the first RSIP clans which are in the minority vote to affirm the transaction.

10. A process, comprising:

using a computer terminal to access a decentralized computer network to confirm a transaction by the decentralized computer network performing a method, said method comprising:

receiving, by a leader clan, a transaction confirmation request comprising said transaction;

determining, by the leader clan, whether to affirm said transaction;

sending, by the leader clan, said transaction and a leader clan signature to an oracle clan for affirmation based on said transaction being affirmed by the leader clan, wherein the oracle clan is one of a plurality of clans;

sending, by the oracle clan, (i) said transaction, (ii) the leader clan signature, and (iii) an oracle clan signature to a first plurality of randomly selected clans ("first RSIP clans") based on said transaction and the leader clan signature being affirmed by the oracle clan;

sending, by the first RSIP clans, first RSIP signatures to the oracle clan, based on said transaction, the leader clan signature, and the oracle clan signature being affirmed by the first RSIP clans;

receiving, by the oracle clan, the first RSIP signatures from the first RSIP clans;

determining, by the oracle clan, whether to affirm the first RSIP signatures;

sending, by the oracle clan, said transaction, the oracle clan signature, and the first RSIP signature to the leader clan, based on the oracle clan affirming the first RSIP signatures;

receiving, by the leader clan, said transaction, the oracle clan signature, and the first RSIP signatures from the oracle clan;

determining, by the leader clan, whether to affirm said transaction, the oracle clan signature, and the first RSIP signatures; and broadcasting, by the leader clan, said transaction to the plurality of nodes, based on the leader clan affirming said transaction, the oracle clan signature, and the first RSIP signatures, wherein based on the first RSIP clans not affirming said transaction, the leader clan signature, and the oracle clan signature, the oracle clan sends said transaction, the leader clan signature, and the oracle clan signature to a second plurality of randomly selected clans ("second RSIP clans") to affirm said transaction, and the second RSIP clans comprise a larger number of nodes than the first RSIP clans.

11. The process of claim 10, wherein based on said transaction, the leader clan signature, and the oracle clan signature being affirmed by the second RSIP clans, then the second RSIP clans send second RSIP signatures to the oracle clan, and the oracle clan receives the second RSIP signature from the second RSIP clans and determines whether to affirm the second RSIP signatures.

12. The process of claim 11, wherein based on the oracle clan affirming the second RSIP signatures, then the oracle clan sends said transaction, the oracle clan signature, and the second RSIP signatures to the leader clan;

the leader clan receives said transaction, the oracle clan signature, and the second RSIP signatures from the oracle clan and determines whether to affirm said transaction, the oracle clan signature, and the second RSIP signatures, and based on the leader clan affirming said transaction, the oracle clan signature, and the second RSIP signatures, then the leader clan broadcasts said transaction to the plurality of nodes.

13. The process of claim 10, wherein the leader clan determines whether to affirm said transaction based on blockchain data.

14. The process of claim 10, wherein
the leader clan affirms said transaction when a threshold number of the plurality of nodes comprising the leader clan affirm the transaction, and the plurality of nodes comprising the leader clan is a protocol determined clan.

15. The process of claim 10, wherein the plurality of nodes store said transaction in block data after the leader clan broadcasts said transaction.

16. The process of claim 10, wherein the first RSIP clans perform a sentiment analysis.

17. The process of claim 10, wherein each of the first RSIP clans comprise a same number of nodes.

18. The process of claim 10, wherein
based on the first RSIP clans not affirming said transaction, the leader clan signature, and the oracle clan signature, the oracle clan sends said transaction, the leader clan signature, and the oracle clan signature to the clans in the tribe or tribes of the clans in the first RSIP clans which are in the minority vote to affirm the transaction.

* * * * *